(12) United States Patent
Wurzinger et al.

(10) Patent No.: US 11,754,477 B2
(45) Date of Patent: Sep. 12, 2023

(54) HIGH PRESSURE FREEZING CARTRIDGE AND METHOD OF HIGH PRESSURE FREEZING

(71) Applicant: Leica Mikrosysteme GmbH, Vienna (AT)

(72) Inventors: Paul Wurzinger, Deutsch-Wagram (AT); Rainer Wogritsch, Vienna (AT); Ricardo Vizcaya Benavides, Vienna (AT); Julia König, Vienna (AT)

(73) Assignee: Leica Mikrosysteme GmbH, Vienna (AT)

( * ) Notice: Subject to any disclaimer, the term of this patent is extended or adjusted under 35 U.S.C. 154(b) by 134 days.

(21) Appl. No.: 17/398,083

(22) Filed: Aug. 10, 2021

(65) Prior Publication Data

US 2022/0050033 A1 Feb. 17, 2022

(30) Foreign Application Priority Data

Aug. 14, 2020 (EP) ..................................... 20191161

(51) Int. Cl.
*G01N 1/42* (2006.01)
(52) U.S. Cl.
CPC ...................................... *G01N 1/42* (2013.01)
(58) Field of Classification Search
CPC .......... G01N 1/42; F25D 3/10; A01N 1/0268; A01N 1/0257; A01N 1/0284; A01N 1/0289
See application file for complete search history.

(56) References Cited

U.S. PATENT DOCUMENTS 3,731,466 A * 5/1973 Kunsman ............... G01N 30/80
96/106
3,859,051 A 1/1975 Natelson
(Continued)

FOREIGN PATENT DOCUMENTS

| GB | 1293402 A | 10/1972 |
| JP | H06193812 A | 7/1994 |
| WO | 2014/015962 A1 | 3/2014 |

OTHER PUBLICATIONS

Kaech, et al., "High-Pressure Freezing: Current State and Future Prospects", Methods in Molecular Biology, vol. 1117, pp. 151-171, Jan. 2014.

*Primary Examiner* — Francis C Gray
(74) *Attorney, Agent, or Firm* — Hodgson Russ LLP (57) ABSTRACT

A high pressure freezing cartridge (300, 400, 500) for use in vitrification of a biological sample (10) is provided, the cartridge (300, 400, 500) being adapted to fixedly hold a sample chamber (216, 218, 220) at a sample chamber position (320, 420, 520) in the cartridge (300, 400, 500), a refrigerant channel arrangement comprising at least one refrigerant channel (208, 308, 408, 462, 464, 466, 468, 508, 562, 564, 566, 569) being provided in the cartridge (300, 400, 500) and extending from a surface of the cartridge (300, 400, 500) to the sample chamber position, and the cartridge (300, 400, 500) comprising a baffle structure (350, 450, 550, 571) at a baffle position being adapted to interact with a refrigerant stream in the refrigerant channel arrangement before the refrigerant of the refrigerant stream reaches the sample chamber position in the cartridge (300, 400, 500). A corresponding method in which the high pressure freezing cartridge (300, 400, 500) is used is also part of the present disclosure.

15 Claims, 5 Drawing Sheets

(56) References Cited

U.S. PATENT DOCUMENTS

| | | | |
|---|---|---|---|
| 5,628,197 A | 5/1997 | Rada | |
| 7,621,145 B2* | 11/2009 | Plank | G01N 1/42 83/915.5 |
| 7,632,469 B2* | 12/2009 | Bierleutgeb | G01N 1/42 100/211 |
| 2010/0212331 A1 | 8/2010 | Critser et al. | |
| 2013/0227970 A1* | 9/2013 | Lihl | B29C 45/0053 62/62 |
| 2020/0229427 A1* | 7/2020 | Kilbride | A01N 1/0289 |

* cited by examiner

HIGH PRESSURE FREEZING CARTRIDGE AND METHOD OF HIGH PRESSURE FREEZING

CROSS REFERENCE TO RELATED APPLICATIONS

This application claims priority of European patent application number 20191161.7 filed Aug. 14, 2020, the entire disclosure of which is incorporated by reference herein.

FIELD

The present disclosure relates to a high pressure freezing cartridge for use in vitrification of a biological sample and to a method for high pressure freezing.

BACKGROUND

Water is the most abundant cellular constituent and therefore important for preserving the cellular ultrastructure of biological samples. Currently the only way to fix cellular constituents without introducing significant structural alterations is by cryofixation. There are currently two common methods employed; plunge freezing and high pressure freezing. The present disclosure relates to high pressure freezing.

Cryofixation in general has two distinct advantages over chemical fixation. It is achieved within milliseconds and it ensures simultaneous immobilization of all macromolecular components. Many protein networks are very labile and fall apart with the slightest osmotic or temperature change and these unwanted effects are minimized during cryofixation. These techniques allow the study of biological samples with improved ultrastructural preservation, and can facilitate the study of dynamic processes. Currently, the only method to vitrify thicker samples (up to 200 μm) is by high pressure freezing.

Successful cryofixation (vitrification) should result in the transformation of water from a liquid to an amorphous state without inducing the nucleation of ice crystals. The nucleation of ice crystals is dependent on temperature and pressure. Crystallisation also depends on the cooling rates as freezing is a time dependent process. The cooling rates depend on the thermal properties of water, the sample thickness and the heat extraction flow at the surface of the specimen. High pressure freezing therefore is performed at high pressures and with a high flow of a refrigerant, particularly of liquid nitrogen.

For high pressure freezing, in other words, a biological sample is contacted at a high pressure with a refrigerant which is provided at a cryogenic temperature.

Devices produced for high pressure freezing of biological and industrial samples are marketed under the designations "EM ICE", "EM HPM100" and "EM PACT" by Leica Microsystems. Such devices are described, for example, by A. Kaech and U. Ziegler, "High-Pressure Freezing: Current State and Future Prospects", chapter 8 in J. Kuo (ed.), "Electron Microscopy: Methods and Protocols", Methods in Molecular Biology, vol. 1117, 2014, DOI 10.1007/978-1-62703-776-1_8, pages 151 to 171. With these devices, it is possible to cool a sample with liquid nitrogen at a pressure of up to 2,100 bar to a cryogenic temperature, which is in particular a temperature below 100° C., within a few milliseconds. In one kind of these devices (EM HPM100 and EM ICE), sample cartridges are used to hold the sample during the high pressure freezing process. The sample cartridge is made of high strength plastic and comprises three components, namely two half cylinders with a channel adapted to be supplied with a stream of the refrigerant by the high pressure freezing device, and a sample holding arrangement, typically referred to as "middle plate", with an opening for holding the sample, the middle plate being sandwiched between the half cylinders.

The sample itself is, in the middle plate, enclosed between two discs of a sufficiently thin and therefore thermally conductive material, e.g. sapphire, aluminum, or copper, within the opening of the middle plate, wherein the discs either themselves comprise recesses to receive the sample or are separated by spacer rings to form a retainer for the sample. The pressure at the location of the sample is generated by the refrigerant which is pressurized to e.g. 2,100 bar for this purpose. Further details in this connection are explained with reference to the figures hereinbelow. If reference is made to a "middle plate" hereinbelow, this is intended to refer to a generally flat element, or arrangement of elements adapted to provide a space receiving a sample to be vitrified. Particularly, the middle plate is, in an assembled state, composed at least of a generally flat structure with an through opening in which discs may be arranged to form the sample space.

It was recognized that the sample cartridges just mentioned have some rate of sample loss which can be the result of turbulences in the refrigerant flow which may result in displacing the discs enclosing the sample in the carrier or even can cause a breakage of the discs when they are made of a brittle material, e.g. sapphire. It is an object of the present disclosure to overcome this problem.

SUMMARY

In view of the above, the disclosure relates to a high pressure freezing cartridge for use in vitrification of a biological sample and to a method for high pressure cryofixation with the features of the independent claims. Preferred embodiments are subject of the dependent claims and of the description that follows.

It was recognized by the present inventors that the mentioned sample losses and the breakage of the discs (referred to as "enclosing elements" hereinbelow) enclosing the sample in the middle plate of a cryofixation cartridge is at least in part caused by the stream of refrigerant violently impinging onto these discs, particularly at the beginning of the high pressure freezing process ("shock wave"). According to the present disclosure, it is therefore proposed to use a baffle structure in the flow of the refrigerant, in order to reduce the forces caused by the impingement of the refrigerant stream or to even out pressure peaks. As further explained below, the baffle structure can be a structure formed integrally with another part of the sample cartridge, or it may be an element which is provided separately and is integrated into the cartridge during or prior to assembly.

According to the present disclosure, a high pressure freezing cartridge for use in vitrification of a biological sample is provided, details of which are further explained hereinbelow. Any explanations in connection with the cartridge and its embodiments shall refer to a method in which the cartridge is used, or to an arrangement comprising the cartridge, a microscopic sample and a pressure freezing device in analogous manner. The present disclosure may relate to all such subject matter and its advantages are equally observed there. The present disclosure is not limited to the specific embodiments described hereinafter, but may equally include further or different embodiments as far as covered by the scope of the claims.

The cartridge provided according to the present disclosure is adapted to fixedly hold a sample chamber at a position inside the cartridge which is referred to as a "sample chamber position" hereinafter for reference. The sample chamber may be formed in one of the cartridge elements or one or more of the cartridge elements may be adapted to receive the sample chamber. The cartridge is adapted to pass a cryogenic refrigerant at an elevated pressure from an outside of the cartridge into a proximity of the sample chamber and further through the cartridge thereafter, such that the refrigerant can leave the cartridge or can be withdrawn therefrom after having been used to dissipate heat from a sample arranged in the sample chamber.

In the language as used herein, the term "cartridge" shall refer to an arrangement of components or "cartridge elements" which may be brought into an operational configuration in which passing a cryogenic refrigerant over the sample as mentioned is possible when the cartridge is inserted into a high pressure freezing device. In the language as used herein, when cartridge elements are "brought into an operational configuration", this is intended to refer to any type of assembly, fitting together, connecting, linking, combining, joining or geometrically arranging the cartridge elements such that they may be introduced as one unit, the "cartridge", into a high-pressure freezing arrangement, an "operational configuration" thus referring to a configuration in which the cartridge, or more precisely a sample therein, may be subjected to a high-pressure freezing process. In its operational configuration, the cartridge elements may also be held in place and in a defined spatial relationship to each other by a gripper or holder, the gripper or holder also being adapted to introduce the cartridge into a high-pressure freezing device.

The cartridge elements may particularly include two holding elements. A middle plate may be adapted to be sandwiched between the holding elements, as indicated above for cartridges of the prior art and as further explained below for the cartridge according to the present disclosure. The middle plate may particularly be a substantially flat element comprising an opening adapted to form the sample chamber by fitting two enclosing elements into the opening in a parallel arrangement. These enclosing elements may be substantially flat in their entirety or they may comprise substantially flat regions to be arranged in a predetermined distance to each other by using fixing, gasketing and/or spacer elements, an intermediate space between the enclosing elements or their substantially flat regions defining the sample chamber. The enclosing elements, or one of two enclosing elements may also comprise recesses on one or both sides so that the sample chamber is formed by at least one recess when the enclosing elements are in contact to each other. In a configuration as just mentioned, one of the enclosing elements may be substantially flat in its entirety, and the other one may be provided with a recess region in which it is substantially flat while a rim-like structure surrounding the recess region protrudes in one direction from the recess region. The enclosing elements may be of an essentially circular shape. Further elements may be included to form the sample chamber or may be provided inside the sample chamber.

The term "flat" or "substantially flat" shall, in the language as used herein, refer to any element comprising a first and a second surface wherein the smallest extension of the first and the second surfaces in a direction parallel to the surfaces is substantially larger than a distance between the first and the second surface, "substantially larger" referring to an extension which is larger by a factor of at least 2, 4, 6, 8, 10, 20, 50 or 100 times than an extension to which the extension considered is compared to. For example, such a factor is 6 for a typical sample carrier (diameter 3 mm, thickness 0.5 mm). The term "substantially circular" shall, in the language as used herein, refer to a shape which does not, except for indents, grooves and the like, e.g. for orientation, deviate from a circular shape.

The cartridge provided according to the present disclosure comprises a refrigerant channel arrangement adapted to pass a cryogenic refrigerant from a surface of the cartridge to the sample chamber position at a high pressure. The refrigerant channel arrangement may be formed in any of the cartridge elements mentioned hereinbefore. Refrigerant channel(s) of the refrigerant channel arrangement may also be formed in the operational configuration via grooves in the holding elements which are formed to match each other when the enclosing elements are positioned accordingly, i.e. the wall(s) of the refrigerant channel(s) of the refrigerant channel arrangement may be formed in unison by both holding elements mentioned, each holding element then forming a half or a part of a channel. Any refrigerant channel may be branched into two or more refrigerant channels or two or more refrigerant channels may be combined to form one refrigerant channel after the combination in the refrigerant channel arrangement. As further explained below, in a particularly advantageous configuration, one or more refrigerant channels may be provided as bypassing or encircling the sample chamber position and being provided with access channels to the sample chamber position One or more further refrigerant channels, which may be adapted to pass the refrigerant stream away from the space adapted to form the sample chamber, may be provided in a similar manner in any of the cartridge elements to form the outlet in the refrigerant channel arrangement.

According to the present disclosure, a baffle structure is provided at a baffle position in the cartridge. The baffle structure is, according to the present disclosure, adapted to interact with, or baffle a refrigerant stream in the refrigerant channel(s) of the refrigerant channel arrangement before the refrigerant reaches the sample chamber position in the cartridge, thus avoiding a too violent impingement of the refrigerant stream onto any element arranged in the space adapted to form the sample chamber, e.g. onto its enclosing elements, which may e.g. be formed of sapphire material as mentioned. The baffle is particularly "adapted to interact with" the refrigerant stream by being arranged at beginning or the end of at least one refrigerant channel or channel section being part of the refrigerant channel arrangement and by being oriented in an angle, particularly perpendicular, to an axis of the respective channel or channel section. Therefore, the risk of breaking or loosening the enclosing elements and losing the sample arranged therebetween is substantially reduced in the context of the present disclosure due to the provision of the baffle structure. As mentioned and as further explained below, the baffle structure may be provided integrally with a further part of the cartridge, i.e. one of the holding elements or the middle plate but, in a different embodiment may also be provided separately, i.e. as a further element of the cartridge.

To summarize once more the explanations given above, the cartridge according to the present disclosure may be formed by cartridge elements being brought into an operational configuration, the cartridge elements including two holding elements and a middle plate, the middle plate being adapted to be sandwiched between the holding elements in the operational configuration. In order to sandwich the middle plate between the holding elements, the holding elements comprise planar regions which are adapted to contact corresponding surfaces of the middle plate. For orientation of the cartridge elements in respect to each other, matching or registering structures such as grooves, indents, protrusions etc., particularly adapted to engage with each other, may be provided.

The middle plate preferentially is, as also mentioned before, a flat or substantially flat element comprising an opening adapted to form the sample chamber by fitting enclosing elements as described before into the opening, particularly in a parallel arrangement and/or in a predetermined distance to each other using gasketing, fixing and/or spacer elements. For further details, reference is made to the prior art mentioned and to the specific explanations given below for the embodiments of the disclosure.

Preferably, at least a majority of an outer surface of the cartridge corresponds to a cylindrical shape when the cartridge elements are in their operational configuration. The wording "majority of an outer surface" is used here in order to express that the outer surface of the cartridge is not necessarily cylindrical as a whole, but may comprise grooves, recesses, chamfers and the like, e.g. grooves adapted for fixating engagement by a gripper or holder. At least 50% or at least 75% of the surface area of the cartridge, however, may correspond to the cylindrical shape, i.e. may form a common cylinder or correspond to a (virtual) cylinder. Likewise, a part of an outer surface of each of the holding elements preferably corresponds to the cylindrical shape in the operational configuration of the cartridge elements. As mentioned in connection with sandwiching the middle plate between the holder elements, a further part of the outer surface of the holding elements not corresponding to the cylindrical shape is preferably adapted to be brought into contact with least a part of a respective one of the surfaces of the middle plate in the operational state of the cartridge. The holding elements may particularly be provided as identically shaped elements or they may be configured to be three dimensional mirror images of each other. However, the holding elements may also be non-identical elements and/or they may be provided to not form three dimensional mirror images of each other.

In the cartridge according to the present disclosure, the refrigerant channel arrangement is preferably formed by matching grooves in the holding elements and the baffle structure, in all embodiments of the present disclosure, causes a deviation of a flow of the refrigerant in the refrigerant channel arrangement away from a direction towards the sample position.

The baffle structure may, in an embodiment of the present disclosure, generally be an at least in part disc-like element, wherein the baffle structure in this configuration is provided non-integrally with further parts of the sample cartridge but positioned or fixedly held by at least one of the cartridge elements at the baffle position, and wherein a surface of the baffle structure or a part thereof particularly extends transversally to a longitudinal (cylinder) axis of the cartridge. The baffle structure may, in this embodiment, be substantially flat (in the sense of the definition for the middle plate) in its entirety or may comprise at least a substantially flat region where extensions, bores, or grooves to engage with the cartridge elements for being held in place may be provided in different parts of the baffle structure. The extensions may also extend in parallel to a central axis of the cartridge. The extensions may be part of a substantially flat baffle structure or they may be separate parts (e.g. bolts, screws) which engage with the substantially flat baffle structure (e.g. via bores, threads).

In an alternative embodiment of the present disclosure, the baffle structure is provided integrally with a further part of the sample cartridge, particularly with one or both of the holding elements, and the baffle structure at least in part extends in an angle in relation to a flow direction of refrigerant in the channel arrangement provided therein. In this alternative embodiment, the baffle structure is provided particularly from the same material as the rest of the sample cartridge, e.g. by milling or structuring of a base element or in the context of a molding process used to form the respective holding element accordingly. The baffle structure may, in this embodiment, be provided as a sharp bend or kink in a refrigerant channel, as a structure provided at a (particularly T-like) branching position where one refrigerant channel branches into two or more refrigerant channels, or as a protrusion extending into a refrigerant channel or a chamber in which a refrigerant channel ends. In this embodiment, a recess may be formed in one of the holding elements and a protrusion, forming the baffle structure, may be provided in the other, such that by assembling the cartridge, the protrusion is placed in the recess and thus acts to baffle a refrigerant stream which is provided using a channel ending at, or directed to, the protrusion.

In one embodiment of the present disclosure, the baffle position may correspond to a position at the surface of the cartridge from which at least one refrigerant channel of the refrigerant channel arrangement extends to the sample chamber position. This means that the direct flow of the refrigerant in the direction of the sample may be blocked in this configuration using the baffle structure. In this embodiment, preferably at least one refrigerant feeding channel is provided as a part of the refrigerant channel arrangement, the at least one refrigerant feeding channel extending from a further position at the surface of the cartridge to the at least one refrigerant channel downstream of the baffle structure which is blocked by the baffle structure. In this embodiment, the refrigerant stream is deflected at least once and is therefore configured to not directly impinge onto the sample chamber. A recess at the surface of the cartridge may be provided in this embodiment, the recess being configured as a recessed area matching the shape of and adapted to receive the baffle structure which may, in this embodiment, particularly be a disc-like element formed not integrally with one of the further elements of the cartridge.

In an embodiment of the present disclosure alternative to the embodiment just described, the at least one refrigerant channel arrangement comprises a section extending from the surface of the cartridge to the baffle position and a further section extending from the baffle position to the sample chamber position. The sections may be formed by one or more refrigerant channels. In a preferred variant of this embodiment, a first section provided as a single channel may be used or a first section may be formed by two or more refrigerant channels or a refrigerant channel branching into two or more refrigerant subchannels. At the branching position, the baffle structure may be provided, either as a separate element or a structure formed integrally with at least one of the holding elements. Likewise, in the second section, one, two or more channels may then extend from the baffle position to the sample chamber position. The refrigerant may thus be distributed across several channels and does not directly hit the sample chamber as a single stream at a single position, thus reducing impingement forces.

In the alternative embodiment of the present disclosure just described, the holding elements may comprise recesses to hold the baffle structure when this is provided as a separate element, such that the baffle structure particularly may be arranged to block the refrigerant from streaming along a central axis of the cartridge, as in the prior art, and the middle plate may comprise a bore or opening through which the baffle structure in form of the separate element is adapted to extend when received in the recesses of the holding elements. However, also in this alternative embodiment of the present disclosure just described, at least one of the holding elements may comprise a structure formed integrally therewith, thus forming the baffle structure.

In any configuration, the baffle structure may also comprise holes which are arranged at positions which are different from positions of a longitudinal projection onto the baffle structure of the one or more refrigerant channels extending from the surface of the cartridge to the baffle structure. In other words, such holes are not coinciding with a central axis of the refrigerant channel(s) when the baffle structure is at the baffle position, and, as refrigerant channels extending from the surface of the cartridge to the baffle structure typically are arranged along the longitudinal axis, they do not coincide with the longitudinal axis of the whole cartridge. Such holes may also communicate with individual channels of the refrigerant channel arrangement into which a main channel branches, as explained in more details hereinbefore. By using such "excentric" holes, the advantages as mentioned can be achieved.

In a particularly preferred embodiment of the present disclosure, the channel arrangement includes at least one channel arranged to surround the sample position, particularly in a circular manner, i.e. as a ring-like channel, and this at least one channel surrounding the sample position may include openings towards the sample position. The channel surrounding the sample position may, in this embodiment, be provided as a groove in one of the holding elements only, but it may, as other channels, also be formed by grooves in both holding elements matching each other. If the channel surrounding the sample position is provided as a ring-like channel, the openings towards the sample position may be evenly or unevenly arranged around the ring-like channel, wherein particularly at an upstream position in relation to the refrigerant stream less, smaller or no openings may be provided as compared to a downstream position. As shown in a specific embodiment of the present disclosure in the drawings, the channel arranged to surround the sample position and the openings thereof to the sample position may be provided as an essentially crown-like structure.

In all embodiments of the present disclosure, several baffle structures may be provided, particularly in a cascading arrangement. For example, at a branching position in the channel arrangement, a first baffle structure may be provided and each of the partial channels extending therefrom may be provided with further baffle structures, or several baffle structures may be provided in a single channel. Therefore, any reference to "a" baffle structure is not intended to limit the number of baffle structures to one or exactly one.

As described in other words before, the baffle structure may also be provided as a protrusion integrally with the material of at least one of the holding elements instead of being provided as a disc-like element.

The present disclosure also relates to a method for high-pressure freezing to vitrify a biological sample wherein a cartridge according to any one of the embodiments of the disclosure is used. In the method, the cartridge is positioned in a high-pressure freezing device and a cryogenic refrigerant at an elevated pressure is passed through the at least one refrigerant channel arrangement in the cartridge. The refrigerant is baffled at the baffle structure. As to further features and embodiments of the method provided according to the present disclosure, reference is made to the explanations relating to the inventive cartridge above. Particularly, liquid nitrogen may be used as the cryogenic refrigerant, and a pressure of at least 2,000 (two thousand) bar, particularly a pressure from 2,000 to 2,500 bar or from 2,000 to 2,200 bar may be used.

BRIEF DESCRIPTION OF THE DRAWING VIEWS

Further features of the present disclosure will be described in connection with the appended drawings in which embodiments of the disclosure are described vis-à-vis the prior art. Be it noted that specific features of the embodiments described in connection with the drawings and described above can be used in any combination and/or isolatedly without leaving the scope of the disclosure.

In the Figures, like elements are indicated with identical reference numerals. Repeated explanations thereof are omitted for reasons of conciseness only.

DETAILED DESCRIPTION

Figure 1:
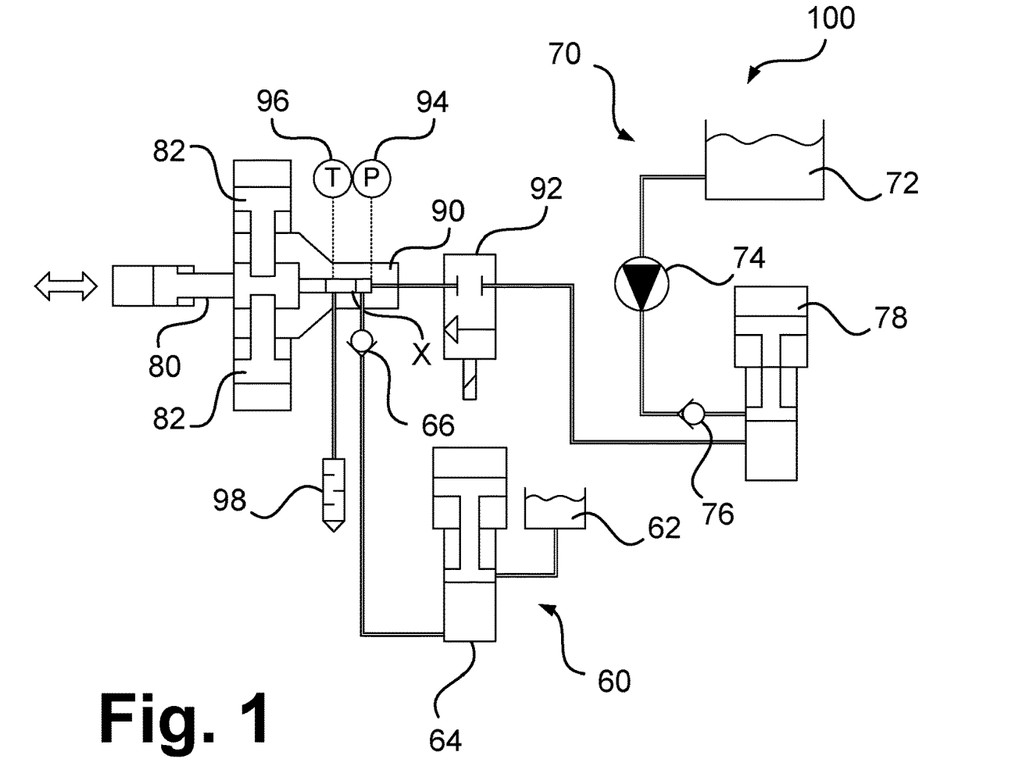
FIG. 1 illustrates a high-pressure freezing system usable in the present disclosure.

FIG. 1 shows the principle design of a high pressure freezing system 100 which can also be used according to the present disclosure. For further explanations, reference is made to the literature cited above for the "EM ICE" and "EM HPM100" systems from Leica Microsystems, e.g. to DE 10 2013 003 164 A1 which further describes details of the high pressure freezing system 100 and a specific embodiment thereof. Further reference is made to review articles such as Kaech & Ziegler (see above). Be it noted that the present disclosure is in no way bound to being used in such a specific system, as the general inventive concept of providing a baffle structure or element for a stream of a cryogenic refrigerant being generally usable in high pressure freezing systems.

A sample cartridge 200-500 which is described in non-inventive and inventive embodiments hereinbelow and which is designated with X in FIG. 1 for reasons of generality may be placed in a high pressure chamber 90 of the system 100 via a loading device 80. For the freezing process, the high pressure chamber 90 is closed by locking the loading device 80 with locking pins 82. The freezing process is achieved by the supply of liquid nitrogen under high pressure which is suddenly introduced into the space in which the cartridge 200-500 is received. For this purpose the system 100 is equipped with a refrigerant supply 70. In the refrigerant supply 70, liquid nitrogen is fed from a refrigerant storage tank 72 via a refrigerant pump 74 with a downstream non return valve 76 to a compressed, air operated pressure intensifier 78. Here the refrigerant is brought to the target pressure of e.g. 2,100 bar. As mentioned already, the present disclosure can also be used in connection with different high-pressure freezing systems and in such systems a refrigerant pump may not be needed.

The outlet of the pressure intensifier 78 is connected to the high-pressure chamber 90 by a supply line via a high-pressure valve 92. The high-pressure valve 92 is designed to abruptly feed the refrigerant under high pressure to the inside of the high-pressure chamber 90 when it is opened, so that the sample held in the cartridge 200-500 is high pressure frozen in a very short time. A pressure sensor 94 and a temperature sensor 96 may be used to monitor the freezing process. Via an outlet opening 98 (outlet with silencer) the high pressure chamber 90 can be depressurized to allow the cryopreserved sample to be removed together with the sample cartridge 200-500.

In addition, a supply arrangement 60 for a further liquid ("filling liquid"), e.g. an alcohol (in particular ethanol) may be provided whereby the filling liquid is supplied to the high-pressure chamber 90 from a container 62 via a pump/dosing system 64 with a non-return valve 66 downstream of the pump/dosing system 64. Also such an arrangement may not be used in connection with embodiments of the present disclosure.

Figure 2:
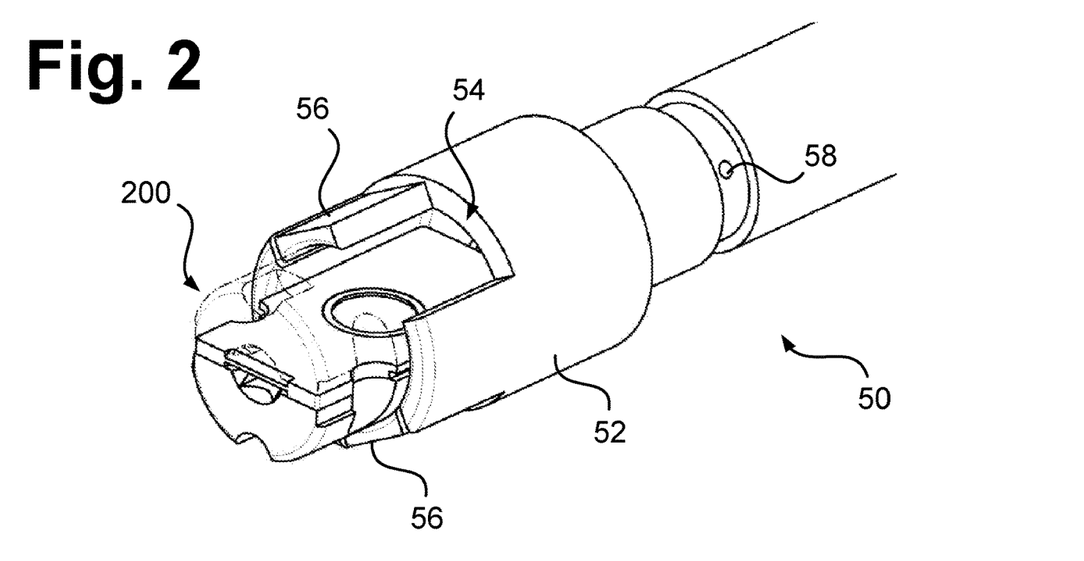
FIG. 2 illustrates a sample cartridge held in a holder usable in the present disclosure.

FIG. 2 shows a sample cartridge 200 according to a non-inventive embodiment which is held in the end piece 52 of a holder 50. The holder 50 may be used to introduce the sample cartridge 200 into a high-pressure freezing system 100 as illustrated in FIG. 1 and may be part of, or used in, the loading device 80. Further details as to this specific aspect are also illustrated in DE 10 2019 003 164 A1. The end piece 52 is made, for example, of stainless steel; it is cup-shaped (with the cup oriented parallel to the longitudinal axis, thus horizontal in the design example) and has, in this specific embodiment, an optional recess 54 on the side corresponding to the location of a viewing window not shown. The end piece 52 includes two opposite parts 56 (also made of stainless steel) with a planoconcave shape. The parts 56 serve as spring tongues and provide a spring action to hold the parts of the sample cartridge together by engaging into grooves of the cartridge 200. The parts 56 are laterally offset for reasons of space requirements for the viewing window; in other designs, these elements may be attached vertically. An outlet 58 explained in connection with FIG. 3 below is also provided.

Figure 3:
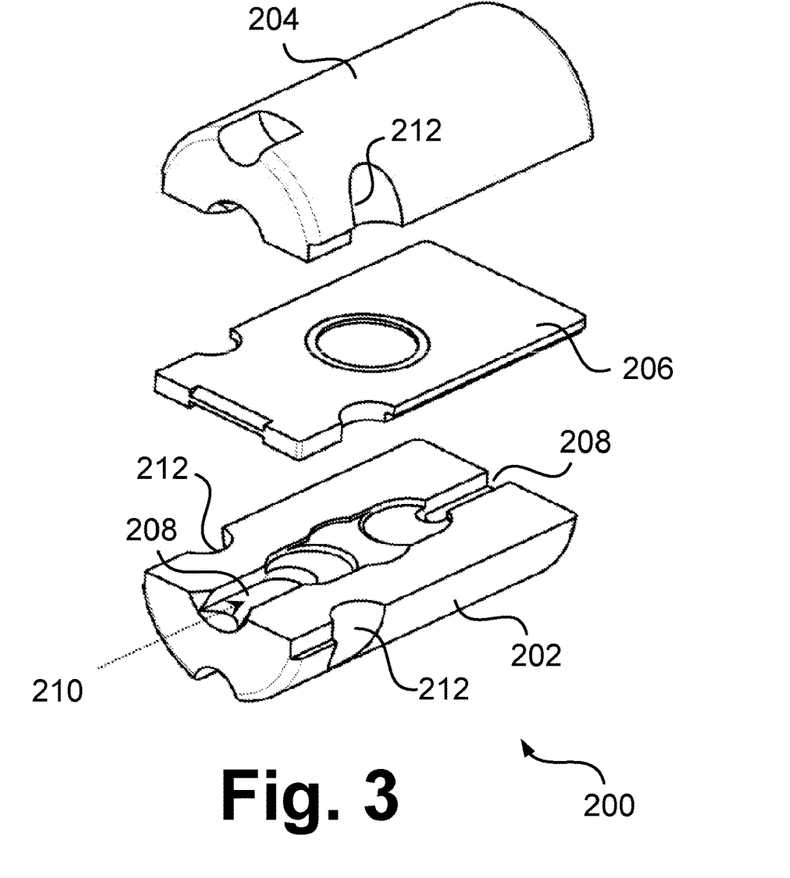
FIG. 3 shows a sample cartridge not according to the disclosure in an exploded view.

FIG. 3 shows the sample cartridge 200 not corresponding to the present disclosure already shown in FIG. 2 in an exploded view. The sample cartridge 200 comprises two holding elements 202, 204, each essentially of a half cylindrical shape. A middle plate 206 is held between the holding elements 202, 204 of the cartridge 200. The holding element 204 is shown in transparent representation in FIG. 2 before, which improves the view of the middle plate 206. The holding elements 202, 204 which each have a substantially semi-cylindrical basic shape, form a refrigerant channel 208 therebetween, the refrigerant channel 208 being formed by grooves along the longitudinal direction on the inner flat surfaces of the holding elements 202, 204. Through the refrigerant channel 208 of a refrigerant channel arrangement, a cryogenic refrigerant can be passed to a sample received in the middle plate 206. In this way, the refrigerant can approach to the sample from both sides, which promotes rapid cooling. In the design shown, a channel 208 is provided from each end face to further improve the supply of refrigerant. This allows, for high pressure cryofixation, the refrigerant to flow through the cartridge 200, essentially along the longitudinal axis of the cartridge 200, in the direction of the dotted arrow 210 in FIG. 3. An opening is provided in the holder 50 shown in FIG. 2 at a suitable position (not shown) which leads to the outlet 58 already mentioned, the latter communicating with the outlet opening 98 of the device 100 (see FIG. 1). In this configuration, gases or liquids displaced by the refrigerant (including any filling liquid such as ethanol) may be discharged. By proper dimensioning, a certain amount of cryogenic refrigerant may flow through the cartridge 200 without causing a pressure reduction within the time required for cryopreservation, and thereafter the discharge of the chamber filling will automatically cause a pressure release.

The holding elements 202 and 204 of the cartridge 200 may comprise lateral grooves or notches 212, e.g., formed in pairs opposite each other, for manipulation of the operational cartridge or fixing the components together. The elements of the cartridge 200 may be made for example of PEEK (polyether ether ketone) or of a transparent plastic (e.g. PC, poly carbonate). The middle plate 206 may be made of PEEK (polyether ether ketone), for example, which makes processing easier. Further details are also known from the prior art.

Figure 4:
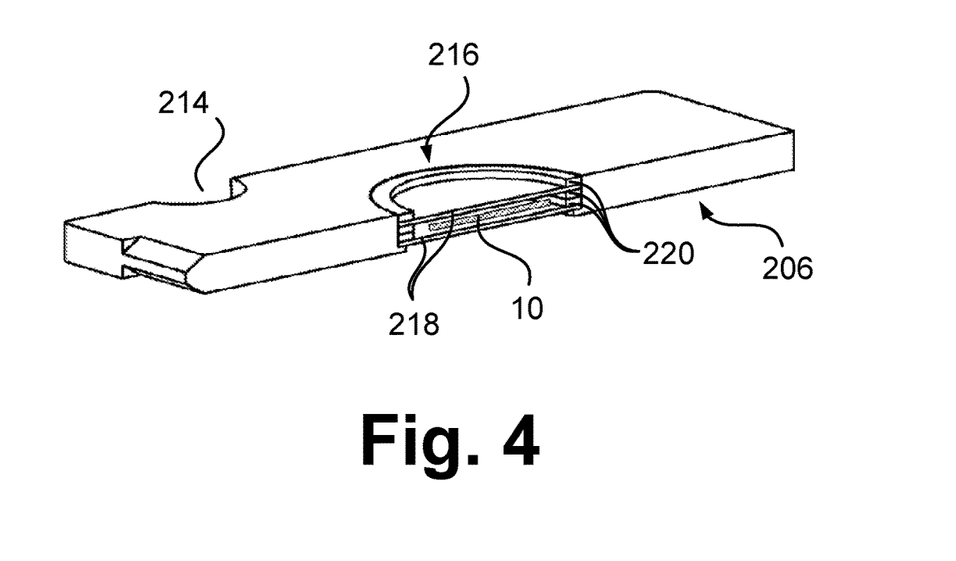
FIG. 4 shows middle plate of FIG. 3 in a more detailed view.

FIG. 4 shows the middle plate 206 which is used in the non-inventive cartridge 200 as shown in FIG. 3 and may also be used in the inventive cartridge 300, 400, or 500 as explained below, with geometrical adaptations as necessary, in a longitudinal section along a vertical plane, so that a space for holding a sample 10 is shown cut open. The middle plate 206 has a notch 214 on each side, which corresponds to the notches 212 mentioned of the holding elements 202, 204, and has a circular opening 216 in its center, in which the sample 10 is held between two enclosing elements 218, e.g. circular discs made of sapphire or another suitable material. The enclosing elements 218 are fixed in the opening 216 and their distance is adjusted by fixing, gasketing and/or spacer means 220. The enclosing elements themselves may also comprise one or more recesses in which the sample 10 can reside when they are brought in contact thereby reducing or eliminating the need for spacers, as mentioned. The enclosing elements 218 also serve to protect the sample 10 since the rapid flow of refrigerant required for cooling would otherwise carry the sample away. Further details are described in the prior art. As mentioned, a rapid inflow of refrigerant, however, may damage the enclosing elements or slightly dislocate them in a way to cause sample leakage which are problems the present disclosure seeks to address.

The entire cartridge 200 is generally dimensioned in such a way that the high pressures (e.g. above 2,000 bar) required for high pressure freezing can be built up and maintained within a period of preferably 200-500 ms, whereby rapid freezing of sample 10 is achieved within this time interval.

Figure 5:
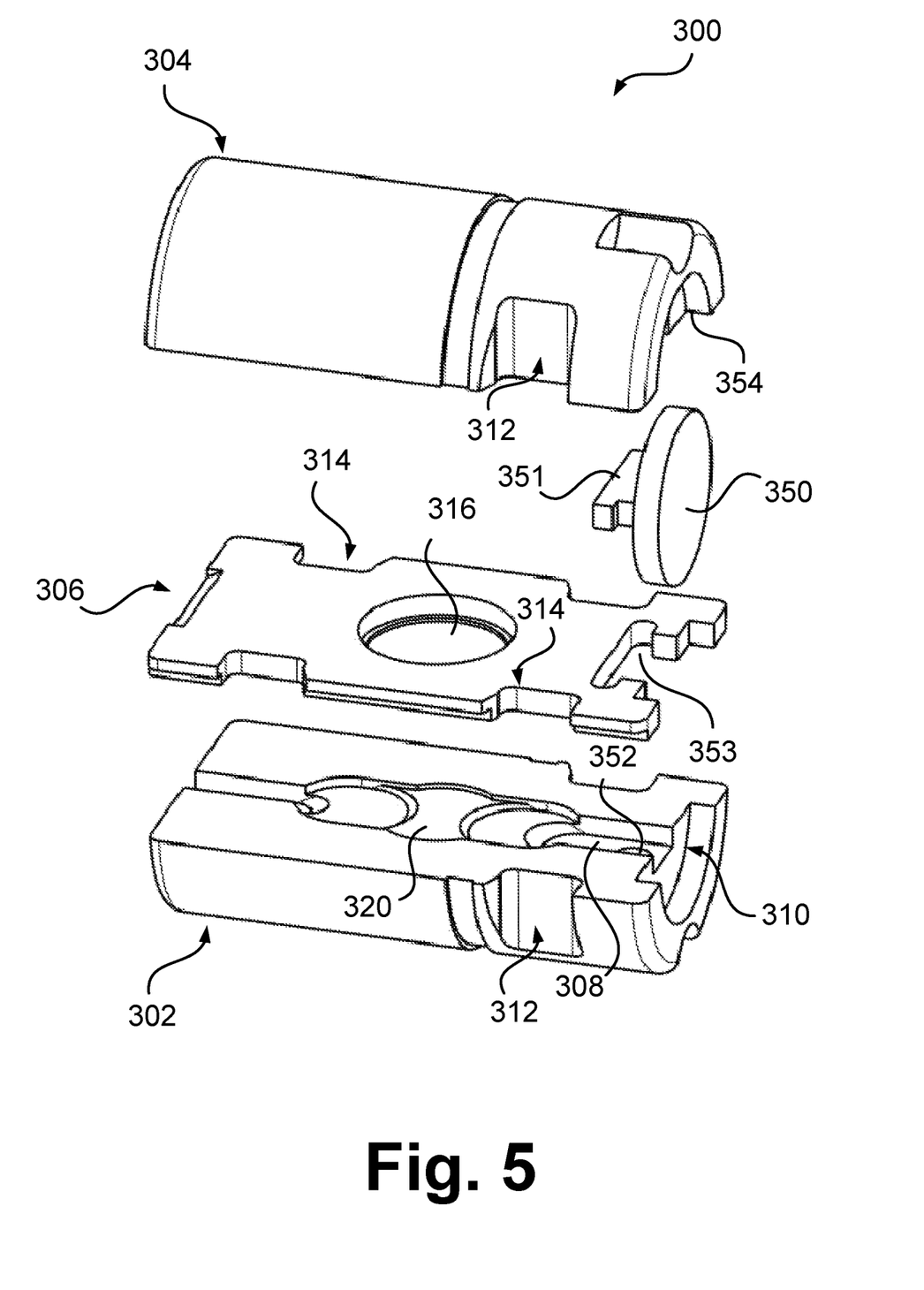
FIG. 5 shows a sample cartridge according to an embodiment of the disclosure.
Figure 6:
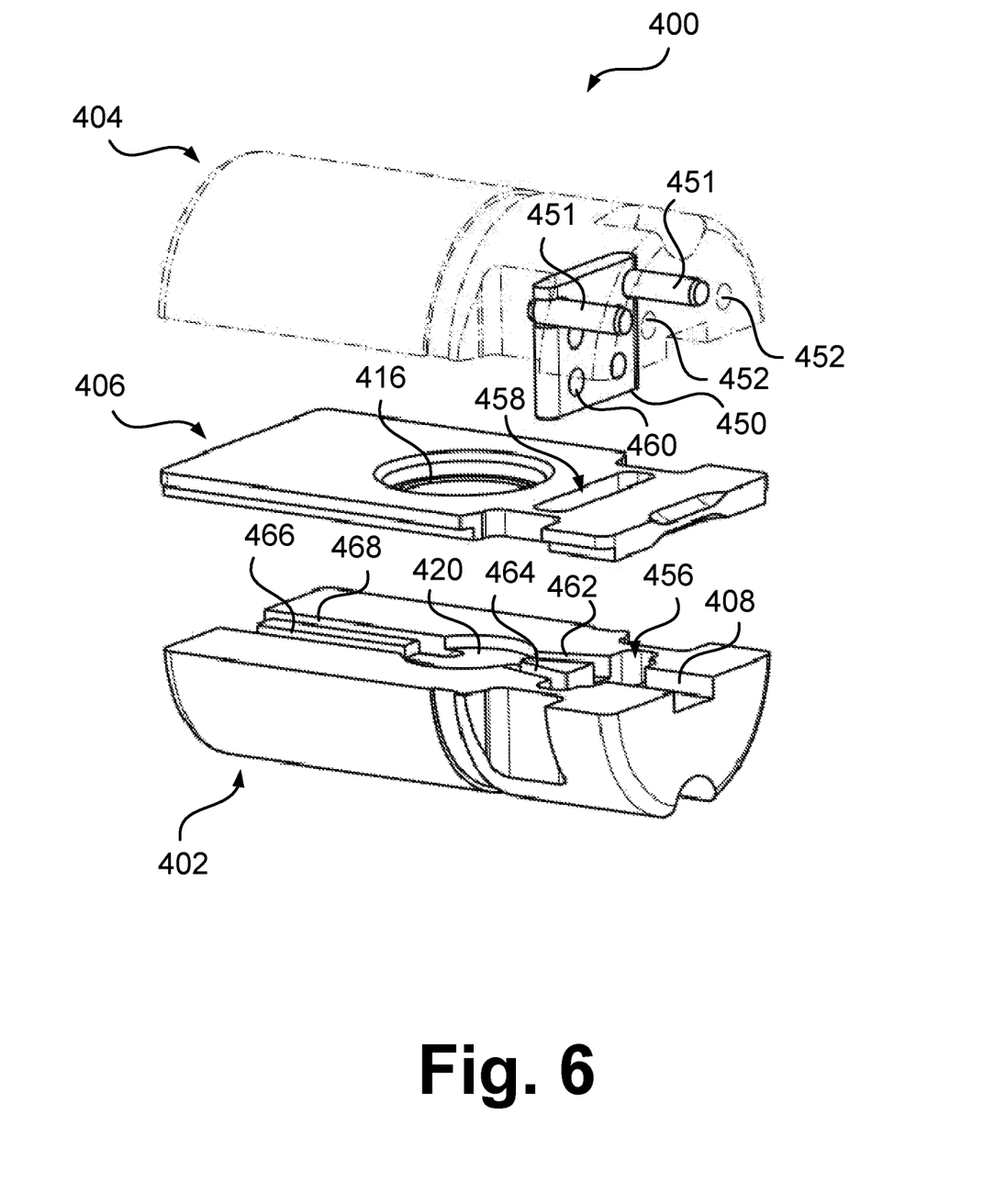
FIG. 6 shows a sample cartridge according to an embodiment of the disclosure.
Figure 7:
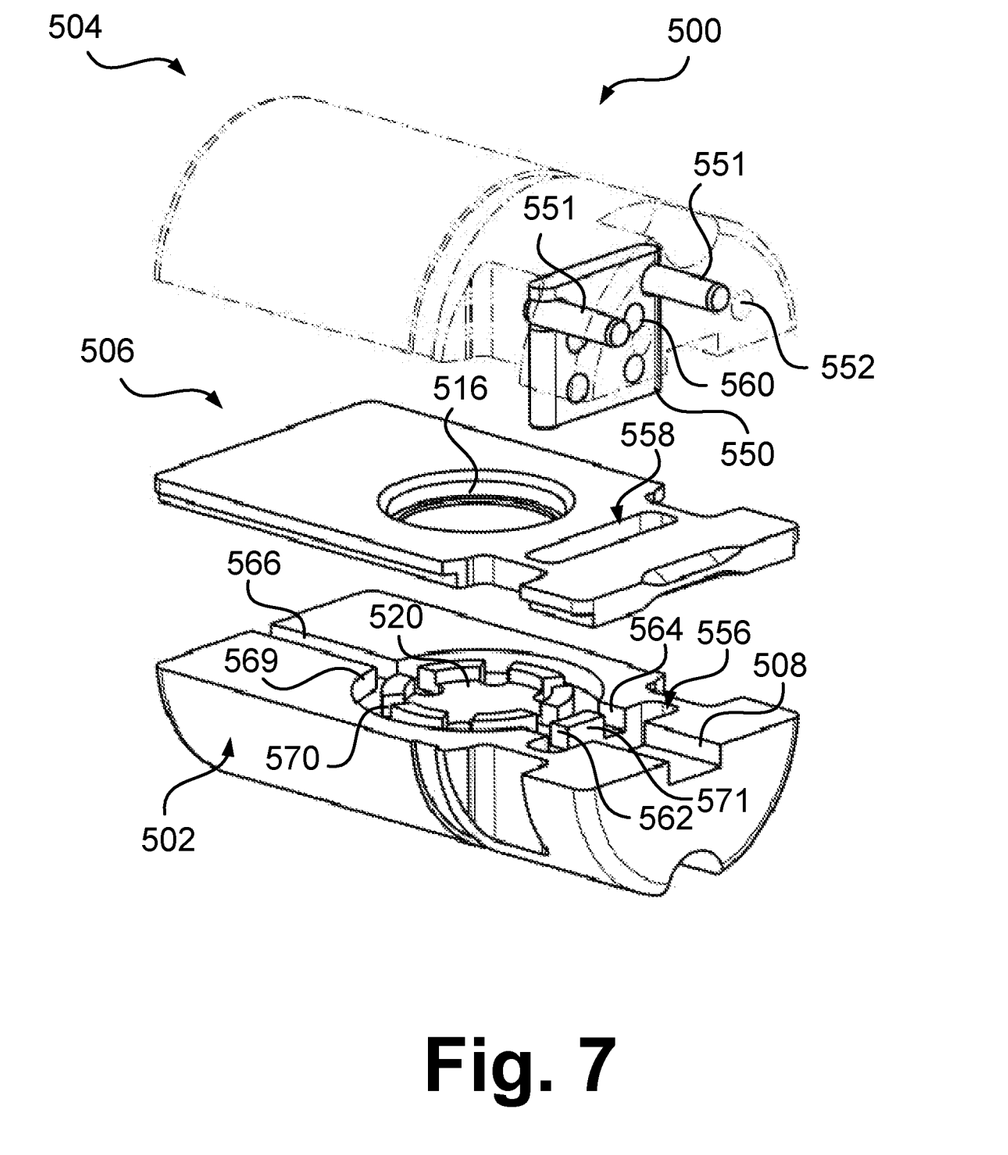
FIG. 7 shows a sample cartridge according to an embodiment of the disclosure.

In FIGS. 5 to 7, sample cartridges according to preferred embodiments of the present disclosure are shown in exploded views and are indicated with 300, 400 and 500. The sample cartridges 300, 400 and 500 comprise cartridge elements which are indicated with reference numerals incremented by 100, 200 or 300 vis-à-vis those explained for cartridge 200. Explanations given above for the corresponding elements also apply for the cartridge elements of the cartridges 300, 400 and 500 unless the subsequent explanations differ and/or are incompatible therewith.

In FIGS. 5 to 7, the middle plates 306, 406 and 506 are displayed alongside the holding elements 302, 304, 402, 404 and 502, 504 in an exploded perspective view. In FIG. 6 and FIG. 7, the holding element 404, 504 is shown in a transparent way to make aspects of the embodiments of the disclosure visible. The middle plates 306, 406 and 506 are shown without a sample chamber being formed in their openings 316, 416 and 516, as this can be done essentially as described hereinbefore in connection with FIG. 2.

The sample cartridges 300, 400 and 500 according to FIGS. 5, 6 and 7 each comprise a baffle structure in the form of a circular and rectangular disc-like baffle element 350, 450 and 550 which will be described in more detail below. The baffle elements 350, 450 and 550 comprise engaging structures 351, 451, 551 for fixedly holding them at a position referred to as a "baffle position" hereinbefore. In the sample cartridge 300, the holding structure 351 is adapted to engage with a matching recess 353 formed in the middle plate 306. In the sample cartridges 400 and 500, two rod-like holding structures 451, 551 are provided which are adapted to engage in corresponding holes 452, 552 in the holding element 404, 504.

In the sample cartridge 300 according to FIG. 5, the baffle position corresponds to a position at the surface of the cartridge 300 from which a refrigerant channel 308 of the refrigerant channel arrangement extends to the sample chamber position which is indicated with reference numeral 320. As the refrigerant channel 308 would thus be blocked by the baffle structure 350, refrigerant feeding channels 352 are provided as a part of the refrigerant channel arrangement. They extend from a further position at the surface of the cartridge 300 to the (blocked) refrigerant channel 308 and thus allow an inflow of refrigerant thereto. A stream of refrigerant thus formed will impinge onto the sample chamber at the sample chamber position less violently and thus the risk of breakage is significantly reduced.

In order to position the baffle structure 350 in the cartridge 300, a recess 354 is provided in the holding elements 302, 304, the recess 354 being adapted to receive the baffle structure 350. The baffle structure comprises, as mentioned, a protrusion referred to as engaging structure 351 with a form to engage with a matching recess 353 in the middle plate 306 so that the baffle structure 350 is held firmly in place when the cartridge 300 is in its operational configuration.

In FIG. 6, only a limited number of elements are indicated with reference numerals as compared to the preceding illustrations. As shown, the sample cartridge 400 according to FIG. 6 comprises several refrigerant channels 408, 462, 464, 466, 468 which are provided to form the refrigerant channel arrangement, wherein the refrigerant channels 462, 464 are separated from the refrigerant channel 408 by the baffle structure 450. Thus, the refrigerant channel arrangement comprises a section extending from the surface of the cartridge 400 to the baffle position and a section from the baffle position to the sample chamber position 420, the sections being subdivided by the baffle structure 450.

In the cartridge 400 according to FIG. 6, the holding elements 402, 404 comprise recesses 456 to hold the baffle structure 450 and the middle plate 406 comprises a bore 458 through which the baffle structure 450 is adapted to extend when received in the recesses 456 of the holding elements 402, 404 and in the operational configuration of the cartridge elements 402, 404 and 406. The baffle structure can be fixedly mounted to one of the holding elements (shown for holding element 404 in FIG. 6), e.g. with suitable bolts or screws as the engagement elements 451 mentioned, which may permanently or removably engage with the holes 453. In the baffle structure 450, which has a rectangular shape, holes 460 are provided which are arranged at positions not coinciding with a central axis of the cartridge 400.

In FIG. 7, only a limited number, or an alternative set of, elements is indicated with reference numerals as compared to the preceding illustrations. As shown, the sample cartridge 500 according to FIG. 7 also comprises several refrigerant channels 508, 562, 564, 566 and 569, albeit in a refrigerant channel arrangement different from that of sample cartridge 400 shown in FIG. 6. Furthermore, the channel arrangement may at least in part be formed in the holding element 502 only. The refrigerant channel 569 is designed, in the embodiment shown, as a circular channel around the sample region 520 and comprises openings 570 towards the sample chamber position 520, thus forming a crown-like structure. The openings 570, in the embodiment shown, are distributed evenly around the circumference of the channel 569 but may, in other configurations, also e.g. have preferentially openings in a downstream region while no or less openings are provided in an upstream region. The channels 566 and 564 may again be separated from the channel 508 by the baffle structure 550. Thus, the refrigerant channel arrangement also comprises a section extending from the surface of the cartridge 500 to the baffle position and a section from the baffle position to the sample chamber position 520, the sections being subdivided by the baffle structure 450. The channel 569 is connected to the single downstream channel 566.

The cartridge 500 may be used with or without a separate disc-like baffle structure 550. If a separate baffle structure 550 is provided, this may be arranged as described for the previous figures or differently. If operated without a separate disc-like baffle structure 550, a wall part 571 between the channels 562 and 564 may serve as a baffle structure instead.

What is claimed is:

1. A high pressure freezing cartridge for use in vitrification of a biological sample, the cartridge being adapted to fixedly hold a sample chamber at a sample chamber position inside the cartridge, the cartridge comprising:
    a refrigerant channel arrangement comprising at least one refrigerant channel extending from a surface of the cartridge, to the sample chamber position; and
    a baffle structure protruding into the refrigerant channel at a baffle position, the baffle structure being adapted to interact with a refrigerant stream in the at least one refrigerant channel before a refrigerant of the refrigerant stream reaches the sample chamber position in the cartridge.

2. The cartridge according to claim 1, wherein the cartridge comprises a plurality of cartridge elements positionable into an operational configuration, the plurality of cartridge elements including two holding elements and a middle plate sandwiched between the two holding elements in the operational configuration of the cartridge elements.

3. The cartridge according to claim 2, wherein the middle plate is a flat element comprising an opening adapted to form the sample chamber by fitting enclosing elements into the opening.

4. The cartridge according to claim 2, wherein at least a majority of an outer surface of the cartridge corresponds to a cylindrical shape, wherein a part of an outer surface of each of the two holding elements corresponds to the cylindrical shape when the cartridge elements, are in the operational state, and wherein a further part of the outer surface of each of the two holding elements not corresponding to the cylindrical shape is adapted to be brought into contact with at least a part of a respective surface of the middle plate in the operational state of the cartridge elements.

5. The cartridge according to claim 2, wherein the two holding elements are identically shaped.

6. The cartridge according to claim 2, wherein the refrigerant channel arrangement comprises at least one refrigerant channel formed by one or more grooves in at least one of the two holding elements.

7. A high pressure freezing cartridge for use in vitrification of a biological sample, the cartridge being adapted to fixedly hold a sample chamber at a sample chamber position inside the cartridge, the cartridge comprising:
- a refrigerant channel arrangement comprising at least one refrigerant channel extending from a surface of the cartridge to the sample chamber position; and
- a baffle structure at a baffle position, the baffle structure being adapted to interact with a refrigerant stream in the at least one refrigerant channel before a refrigerant of the refrigerant stream reaches the sample chamber position in the cartridge;
- wherein the cartridge comprises a plurality of cartridge elements positionable into an operational configuration, the plurality of cartridge elements including two holding elements and a middle plate sandwiched between the two holding elements in the operational configuration of the cartridge elements; and
- wherein the baffle structure is configured as a flat disc with an engaging element, the baffle structure being positioned or fixedly held by at least one of the plurality of cartridge elements at the baffle position by engaging the engaging element to the at least one cartridge element.

8. The cartridge according to claim 7, wherein the baffle position corresponds to a position at the surface of the cartridge from which the at least one refrigerant channel of the refrigerant channel arrangement extends to the sample chamber position.

9. The cartridge according to claim 8, wherein the refrigerant channel arrangement comprises at least one refrigerant feeding channel extending from a further position at the surface of the cartridge to communicate with the at least one refrigerant channel at a position downstream of the baffle structure.

10. The cartridge according to claim 8, wherein a recess at the surface of the cartridge is provided, wherein the recess is configured to receive the baffle structure.

11. The cartridge according to claim 6, wherein the refrigerant channel arrangement comprises a section formed by one or more refrigerant channels extending from the surface of the cartridge to the baffle position and another section including one or more further refrigerant channels extending from the baffle position to the sample chamber position.

12. A high pressure freezing cartridge for use in vitrification of a biological sample, the cartridge being adapted to fixedly hold a sample chamber at a sample chamber position inside the cartridge, the cartridge comprising:
- a refrigerant channel arrangement comprising at least one refrigerant channel extending from a surface of the cartridge to the sample chamber position; and
- a baffle structure at a baffle position, the baffle structure being adapted to interact with a refrigerant stream in the at least one refrigerant channel before a refrigerant of the refrigerant stream reaches the sample chamber position in the cartridge;
- wherein the cartridge comprises a plurality of cartridge elements positionable into an operational configuration, the plurality of cartridge elements including two holding elements and a middle plate sandwiched between the two holding elements in the operational configuration of the cartridge elements;
- wherein the refrigerant channel arrangement comprises at least one refrigerant channel formed by one or more grooves in at least one of the two holding elements;
- wherein the refrigerant channel arrangement comprises a section formed by one or more refrigerant channels extending from the surface of the cartridge to the baffle position and another section including one or more further refrigerant channels extending from the baffle position to the sample chamber position; and
- wherein the holding elements comprise recesses to receive the baffle structure, and wherein the middle plate comprises a bore through which the baffle structure extends when the baffle structure is received in the recesses of the holding elements.

13. A high pressure freezing cartridge for use in vitrification of a biological sample, the cartridge being adapted to fixedly hold a sample chamber at a sample chamber position inside the cartridge, the cartridge comprising:
- a refrigerant channel arrangement comprising at least one refrigerant channel extending from a surface of the cartridge to the sample chamber position; and
- a baffle structure at a baffle position, the baffle structure being adapted to interact with a refrigerant stream in the at least one refrigerant channel before a refrigerant of the refrigerant stream reaches the sample chamber position in the cartridge;
- wherein the cartridge comprises a plurality of cartridge elements positionable into an operational configuration, the plurality of cartridge elements including two holding elements and a middle plate sandwiched between the two holding elements in the operational configuration of the cartridge elements;
- wherein the refrigerant channel arrangement comprises at least one refrigerant channel formed by one or more grooves in at least one of the two holding elements;
- wherein the refrigerant channel arrangement comprises a section formed by one or more refrigerant channels extending from the surface of the cartridge to the baffle position and another section including one or more further refrigerant channels extending from the baffle position to the sample chamber position; and
- wherein the baffle structure comprises holes arranged at positions which are different from positions of straight line projections of the one or more refrigerant channels extending from the surface of the cartridge to the baffle structure.

14. A high pressure freezing cartridge for use in vitrification of a biological sample, the cartridge being adapted to fixedly hold a sample chamber at a sample chamber position inside the cartridge, the cartridge comprising:
- a refrigerant channel arrangement comprising at least one refrigerant channel extending from a surface of the cartridge to the sample chamber position; and
- a baffle structure at a baffle position, the baffle structure being adapted to interact with a refrigerant stream in the at least one refrigerant channel before a refrigerant of the refrigerant stream reaches the sample chamber position in the cartridge;
- wherein the baffle structure is provided as a protrusion integrally with the material of at least one of the holding elements.

15. A method for high pressure freezing to vitrify a biological sample, the method comprising:
- providing a cartridge according to claim 1;
- positioning the cartridge in a high pressure freezing device; and passing a cryogenic refrigerant at an elevated pressure through the refrigerant channel arrangement of the cartridge to withdraw heat from the sample.

* * * * *